US008744373B2

(12) United States Patent
Pourseyed

(10) Patent No.: US 8,744,373 B2
(45) Date of Patent: Jun. 3, 2014

(54) MULTIPLE ANTENNA SYSTEM FOR WIRELESS COMMUNICATION

(75) Inventor: Behrouz Pourseyed, Richmond (CA)

(73) Assignee: NETGEAR, Inc., San Jose, CA (US)

( * ) Notice: Subject to any disclaimer, the term of this patent is extended or adjusted under 35 U.S.C. 154(b) by 730 days.

(21) Appl. No.: 12/717,793

(22) Filed: Mar. 4, 2010

(65) Prior Publication Data

US 2010/0238075 A1 Sep. 23, 2010

Related U.S. Application Data

(60) Provisional application No. 61/161,343, filed on Mar. 18, 2009.

(51) Int. Cl.
*H04B 7/02* (2006.01)

(52) U.S. Cl.
USPC .............................. 455/101; 455/83; 455/132

(58) Field of Classification Search
USPC .............................. 455/101
See application file for complete search history.

(56) References Cited

U.S. PATENT DOCUMENTS 6,201,511 B1 3/2001 Xue
6,426,723 B1 7/2002 Smith et al.
6,693,594 B2 2/2004 Pankinaho et al.
6,990,357 B2 1/2006 Ella et al.
7,068,234 B2 6/2006 Sievenpiper
7,106,252 B2 9/2006 Smith et al.
7,116,952 B2 * 10/2006 Arafa .......... 455/132
7,155,252 B2 12/2006 Martin et al.
7,164,387 B2 1/2007 Sievenpiper
7,187,945 B2 3/2007 Ranta et al.
7,269,441 B2 9/2007 Ella et al.
7,298,339 B1 11/2007 Ollikainen
7,450,072 B2 11/2008 Kim et al.
7,460,069 B2 12/2008 Park et al.
2002/0118724 A1 * 8/2002 Kishimoto et al. .......... 375/132

(Continued)

FOREIGN PATENT DOCUMENTS

CA 2562053 11/2005
EP 1 976 133 1/2008

(Continued)

OTHER PUBLICATIONS

Burr, A. et al., "Multiband MIMO Antenna Arrays," IEE Digest, vol. 2005, No. 11109, Wideband and Multi-Band Antennas and Arrays, pp. 135-139, Sep. 2005.

(Continued)

*Primary Examiner* — Ajibola Akinyemi
(74) *Attorney, Agent, or Firm* — Boyle Fredrickson, S.C.

(57) ABSTRACT

The invention provides an antenna system for wireless communications and in particular to a multiple antenna system for operation in conjunction with a radio frequency (RF) front end for wireless communication. The antenna system comprises one or more antennas configurable for transmission and reception in a first set of configurations and configured for transmission in a second set of configurations. The antenna system further comprises two or more antennas configurable for MIMO-diversity reception for the second set of configurations. The antennas that are configured for MIMO-diversity reception may be tunable, and may have similar characteristics to enhance MIMO reception. Mobile communications terminals utilizing the antenna system, and radio-frequency (RF) front ends for operation in conjunction with the antenna system are also provided. The antenna system may support communications in multiple frequency bands and/or multiple communication standards of operation.

33 Claims, 11 Drawing Sheets

(56) References Cited

U.S. PATENT DOCUMENTS

| | | | | |
|---|---|---|---|---|
| 2005/0104777 | A1 | 5/2005 | Smith et al. | |
| 2005/0227631 | A1* | 10/2005 | Robinett | 455/83 |
| 2005/0245201 | A1 | 11/2005 | Ella et al. | |
| 2005/0245202 | A1 | 11/2005 | Ranta et al. | |
| 2006/0220959 | A1 | 10/2006 | Ying | |
| 2006/0276132 | A1 | 12/2006 | Sheng-Fuh et al. | |
| 2007/0021080 | A1 | 1/2007 | Kuriyama et al. | |
| 2007/0046545 | A1 | 3/2007 | Sung et al. | |
| 2007/0049213 | A1 | 3/2007 | Tran | |
| 2007/0115181 | A1 | 5/2007 | Park et al. | |
| 2007/0188390 | A1 | 8/2007 | Dunn et al. | |
| 2007/0232241 | A1* | 10/2007 | Carley et al. | 455/83 |
| 2008/0074341 | A1 | 3/2008 | Chung et al. | |
| 2008/0166980 | A1* | 7/2008 | Fukamachi et al. | 455/83 |
| 2008/0198082 | A1 | 8/2008 | Soler Castany et al. | |
| 2008/0266181 | A1 | 10/2008 | Ying | |
| 2008/0291103 | A1 | 11/2008 | Bolin | |
| 2009/0121951 | A1* | 5/2009 | Kaneda | 343/745 |

FOREIGN PATENT DOCUMENTS

| | | | | |
|---|---|---|---|---|
| EP | 1881 558 | A2 | 1/2008 | |
| WO | WO 03/103090 | A1 | 12/2003 | |
| WO | WO 2005/104389 | | 3/2005 | |
| WO | WO 2009/030044 | A1 | 3/2009 | |
| WO | WO 2009079701 | A1 * | 7/2009 | H04B 1/00 |

OTHER PUBLICATIONS

Chu L.J., "Physical Limitations of Omni-Directional Antennas," J. Appl. Phys., vol. 19, pp. 1163-1175, Dec. 1948.

Collin, R.E. et al., "Evaluation of Antenna Q," IEEE TAP vol. 12, pp. 23-27, Jan. 1964.

Fante, R.L., "Quality Factor of General Ideal Antennas," IEEE TAP vol. 17, pp. 151-155, Mar. 1969.

Hansen, R.C., "Fundamental Limitations in Antennas," IEEE, vol. 69, No. 2, pp. 170-182, Feb. 1981.

Harrington, R.F., "Effect of Antenna Size on Gain, Bandwidth, and Efficiency," J. Res. Nat. Bureau of Standards, vol. 64-D, pp. 1-12, Jan./Feb. 1960.

Lopez, A.R., "Harold A. Wheeler's Antenna Design Legacy," IEEE Systems, Applications and Technology Conference, May 2007.

Wheeler, H.A., "Fundamental Limitations of Small Antennas," IEEE vol. 69/Proc. IRE, vol. 35, pp. 1479-1484, Dec. 1947.

Caimi, Frank M., et al. "Isolated Mode Antenna Technology." Jan. 8, 2008, p. 2.

British Examination Report Dated Jun. 17, 2013.

Ethertronics Document—MIMO Antenna Performance for Handsets and Data Terminats—Nov. 2008.

Internatonal Search Report, International application No. PCT/CA2010/000285.

Australian Patent Examination Report 2 dated Jan. 9, 2014 for Australian Patent Application Serial No. 2010225399.

* cited by examiner (A)

(B)

(A)

(B)

MULTIPLE ANTENNA SYSTEM FOR WIRELESS COMMUNICATION

FIELD OF THE INVENTION

The present invention pertains in general to systems for wireless communications and in particular to a multiple antenna system for operation in conjunction with a radio frequency (RF) front end for wireless communication.

BACKGROUND

Wireless communication devices, such as cellular telephones, PDAs, wireless adapters, communications-equipped computers or laptops, and the like, typically contain one or more antennas coupled to a radio frequency (RF) front end to support radio transmission and/or radio reception. To facilitate improved performance, multiple antenna systems can be used in mobile wireless communication devices. Multiple antenna systems can be used for various purposes such as separating transmit and receive functions, facilitating communication over multiple frequency bands and/or communication modes, antenna diversity, multiple-input multiple-output (MIMO) schemes, smart antenna systems, beamforming, space-time coding, and the like.

Many different frequency bands in the range from 700 MHz through to 2500 MHz are now being allocated for cellular radio communication and users increasingly expect to be able to use whichever frequency band is available in any location. Additionally, there is also a trend for compact wireless communications devices.

Current wireless communication standards, such as the Universal Mobile Telecommunication System (UMTS) standard and the related Long Term Evolution (LTE) project, have proposed using multiple antenna technologies such as MIMO for communication in certain frequency bands. However, support for MIMO may only be required in a certain subset of frequency bands, and this subset may change by region. Furthermore, a multi-mode mobile device may be required to support additional standards, such as Global System for Mobile Communications (GSM), Wi-Fi, Wi-MAX, CDMA2000, or various other communication standards. Emerging standards utilize diversity reception and specifically, MIMO reception. For example, LTE, an emerging standard, specifies MIMO diversity reception.

Several multi-antenna solutions supporting antenna diversity or MIMO in at least one mode have been proposed in the art. One feature of such prior art solutions is that they typically rely on a main antenna for both transmitting and receiving operation at multiple frequencies, plus one or more secondary antennas which support diversity features when required e.g. when the main antenna finds itself in a multipath cancellation null. The secondary antennas may be smaller and lesser performing relative to the main antenna and still perform this function adequately. However, this approach has several drawbacks. First, since the main antenna is dissimilar to the secondary antenna, implementation of diversity or MIMO schemes can be challenging. Second, the main antenna must be sufficiently operable over a wide frequency band, which requires sophisticated design and a potentially large main antenna footprint. This can work against limitations on cost and/or antenna package size.

As the data rate of wireless systems increases through techniques such as advanced time-space coding and complex modulation schemes, the need for more complex radio frequency (RF) front-end and antenna systems becomes more critical, particularly in targeting the current multiplicity of wireless systems and their frequency bands of operation.

Therefore there is a need for a multiple antenna system for operation with a front end for a mobile wireless communication device that is not subject to one or more of the limitations of the prior art.

This background information is provided to reveal information believed by the applicant to be of possible relevance to the present invention. No admission is necessarily intended, nor should be construed, that any of the preceding information constitutes prior art against the invention.

SUMMARY OF THE INVENTION

An object of the present invention is to provide a multiple antenna system for wireless communication. In accordance with an aspect of the invention, there is provided an antenna system for operation in conjunction with a radio frequency (RF) front end of a wireless communications device, said antenna system comprising: one or more non-tunable antennas configurable for transmission and reception in a first set of one or more configurations, and configurable for transmission in a second set of one or more configurations; and two or more narrowband antennas configurable for Multiple Input Multiple Output (MIMO)-diversity reception for the configurations of said second set.

In another aspect of the invention, there is provided an antenna system and radio frequency (RF) front end of a wireless communications device, said antenna system comprising: one or more non-tunable antennas configurable for transmission and reception in a first set of one or more configurations, and configurable for transmission in a second set of one or more configurations; and two or more narrowband antennas configurable for Multiple Input Multiple Output (MIMO)-diversity reception for the configurations of said second set; said radio frequency front end comprising: a set of one or more switches selectably operable in a position selected from a first set of positions and a second set of positions, the first set of positions adapted to facilitate configuration of the one or more non-tunable antennas in accordance with the first set of one or more configurations, the second set of positions adapted to facilitate configuration of the one or more non-tunable antennas and the two or more narrowband antennas in accordance with the second set of one or more configurations.

In another aspect of the invention, there is provided a radio frequency (RF) front end for operation in conjunction with an antenna system of a wireless communications device, said antenna system comprising one or more non-tunable antennas and two or more narrowband antennas, said radio frequency front end comprising: a set of one or more switches selectably operable in a position selected from a first set of positions and a second set of positions, the first set of positions adapted to facilitate configuration of the one or more non-tunable antennas for transmission and reception, the second set of positions adapted to facilitate configuration of the one or more non-tunable antennas for transmission, the second set of positions further adapted to facilitate configuration of the two or more narrowband antennas for Multiple Input Multiple Output (MIMO)-diversity reception.

In another aspect of the invention, there is provided a method for operating an antenna system and radio frequency (RF) front end of a wireless communication device, the antenna system comprising one or more non-tunable antennas configurable for transmission and reception and two or more narrowband antennas configurable for MIMO-diversity reception, the method comprising the steps of: selecting a configuration of the antenna system and the RF front end from a set of potential configurations, said set of potential configurations including a first set of one or more configurations wherein at least one of the one or more non-tunable antennas is configured for transmission and reception, said set of potential configurations including a second set of one or more configurations wherein at least one of the one or more non-tunable antennas is configured for transmission and at least two of the two or more narrowband antennas are configured for MIMO-diversity reception; and configuring the antenna system and the RF front end in accordance with the selected configuration.

In another aspect of the invention, there is provided a wireless communications device utilizing the antenna system and/or RF front end of the invention.

In embodiments of the invention, the antenna system and/or RF front end are operable to mitigate problems of conventional MIMO terminal design, and satisfy antenna performance metrics for MIMO reception.

In embodiments of the invention, the antenna system and/or RF front end supports communications in multiple frequency bands and/or multiple communication standards of operation, and said configurations differ in frequency band of operation or communication standard of operation or both. In embodiments of the invention, said narrowband antennas are substantially matched, and have a desired correlation coefficient there-between to allow for MIMO reception. In another embodiment of the present invention, said narrowband antennas each have a desired mean-effective gain or ratio of mean-effective gains. In embodiments of the invention, at least one of said narrowband antennas is tunable. In embodiments of the invention, said narrowband antennas support operation in multiple frequency bands. In embodiments of the invention, said non-tunable antenna is a single wideband antenna capable of transmission and reception in said first set of configurations, and transmission in said second set of configurations.

DETAILED DESCRIPTION OF THE INVENTION

Definitions

The term “transceiver” is used to refer to a radio communication system that performs operations related to either or both of radio transmission and reception by leveraging electromagnetic coupling between antennas. A transceiver typically includes one or more antennas, and electronics operatively coupled to an antenna to translate between electromagnetic radiation in the antenna and a local analog or digital signal representative of data encoded into the electromagnetic radiation.

The term “modal diversity” is used herein to refer to an antenna property wherein an antenna can be excited or connected in different ways and/or at different locations, thereby generating distinct and nominally independent modes. Modal diversity can be used to generate distinct or different beam patterns and/or polarizations, as would be readily understood by a worker skilled in the art.

The term “frequency band” is used herein to refer to any one or more frequencies of the electromagnetic spectrum that are used for transmitting and receiving signals wirelessly in any of the various parts of the world. The frequencies include but are not limited to the frequencies used for cellular communications, Bluetooth, Wi-Fi, Wi-Max, and Global Positioning System (GPS). For example, the term “frequency band” can include frequencies such as 1.575 GHz, used for GPS; and the range of 2.4000 to 2.4835 GHz, used by Bluetooth and Wi-Fi transceivers.

Figure 3:
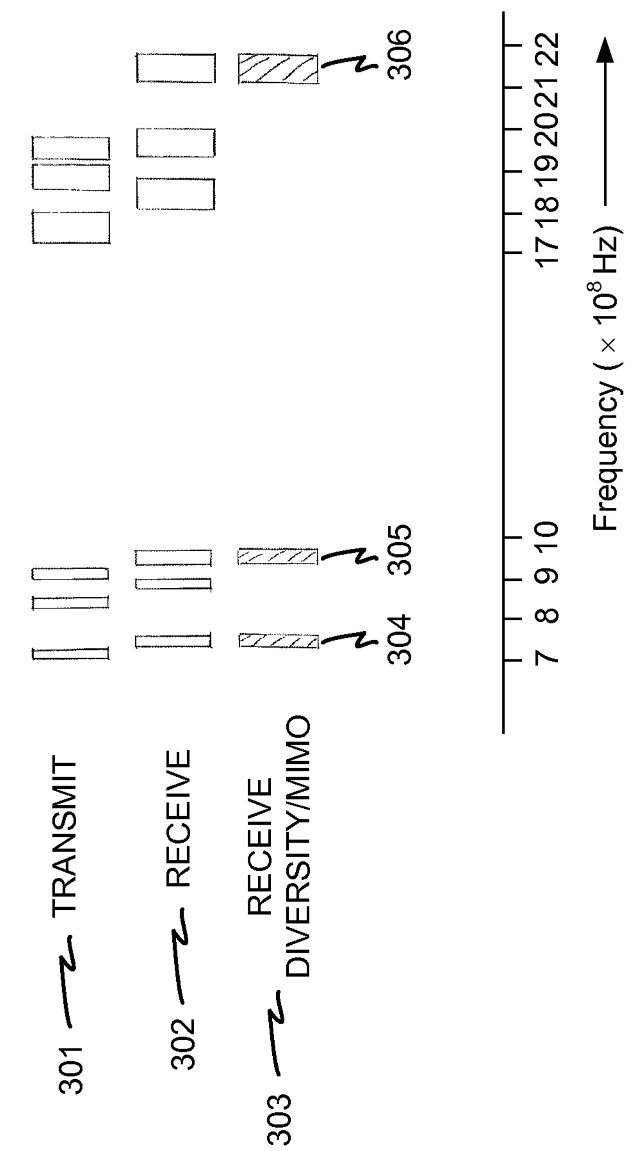
FIG. 3 illustrates various exemplary frequency bands of operation for wireless communications.
Figure 4:
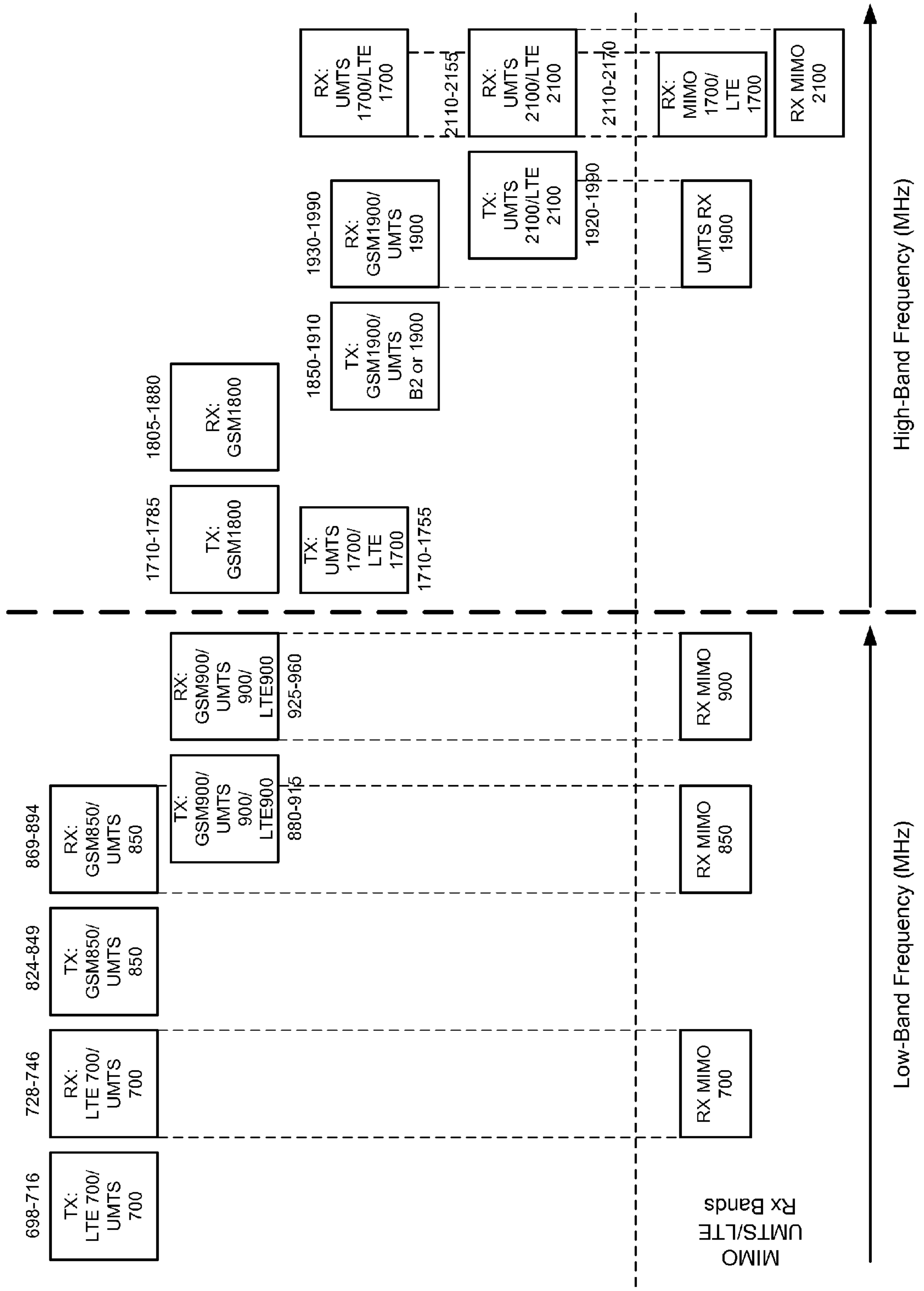
FIG. 4 illustrates various exemplary frequency bands of operation for wireless communications.

FIGS. 3 and 4 show some exemplary frequency bands used in cellular communications for transmission and reception. These frequency bands can be broadly grouped into those in a lower range of 700 MHz to 1 GHz and an upper range of 1.7 GHz to 2.2 GHz or higher. A worker skilled in the art will appreciate that not all the frequency bands are used in all regions around the world. A worker skilled in the art will also appreciate that the given low band and high band frequency ranges are merely exemplary of the current deployment plans of some carriers, and other carriers may use newly installed bands outside the frequency ranges mentioned above.

Other frequency ranges may also be reserved in the future for cellular communications. For example, the current 3GPP (Third Generation Partnership Project) standard has specifications for 14 UMTS bands although infrastructure may not be installed to support all of these bands. A worker skilled in the art would appreciate that the invention is not limited to a currently proposed or implemented standard specification, and may be extended to scenarios with additional or different bands. FIG. 4 is not shown in a constant scale of frequency.

A frequency band may be ‘narrow-band’, i.e., the band includes relatively fewer frequency components; or may be ‘wide-band’ i.e., the band includes relatively more frequency components. It should also be appreciated that a given frequency band may be the result of a combination of two or more other frequency bands. For example, the term ‘narrow-band’ may also be used herein to refer to a frequency band comprising the combination of a relatively few narrow-band frequency sub-bands.

The term "RF front end" is used herein to include the electronic circuitry (e.g. branching circuits, RF switches, RF filters and/or duplexers that connect the signal processing paths of the receiver and transmitter to the antenna system. In embodiments, the RF front end includes the transmitter/receiver branching circuit used in conjunction with the antenna system of the invention to offer a flexible communication system.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

Embodiments of the invention provide an antenna system for operation in conjunction with a radio frequency (RF) front end for wireless communications. The antenna system comprises one or more first antennas configurable for transmission and reception in a first set of configurations and configurable for transmission in a second set of configurations. The antenna system further comprises a further two or more second antennas which are configurable to provide MIMO-diversity reception in the second set of configurations.

Embodiments of the invention provide an antenna system and an associated RF front end. The RF front end may be configured to couple transceiver electronics to the antenna system in a reconfigurable manner, for example via RF switches or other switching means. The antenna system and associated RF front end may be operable in at least one mode which advantageously satisfies a predetermined set of performance metrics related to MIMO or diversity reception. The antenna system and associated RF front end may also be operable in another mode which does not use MIMO or diversity reception.

For example, in the case of an antenna system comprising one or more first antennas configurable for transmission and reception and two or more second antennas configurable to provide MIMO-diversity reception as described above, the RF front end can comprise a set of one or more switches selectably operable in a position selected from a first set of positions and a second set of positions. As used herein, the term "position" can refer to a collective position of a plurality of switches, and a set of switch positions can correspondingly refer to a set of collective positions. The first set of positions is adapted to facilitate configuration of the one or more non-tunable antennas in accordance with the first set of one or more configurations, as described above. The second set of positions adapted to facilitate configuration of the one or more non-tunable antennas and the two or more narrowband antennas in accordance with the second set of one or more configurations, as described above.

Embodiments of the invention provide an RF front end for operation in conjunction with an antenna system. The antenna system comprises one or more non-tunable antennas and two or more narrowband antennas. The radio frequency front end comprises a set of one or more switches, such as single-pole multi-throw or multi-pole multi-throw RF switches, selectably operable in a position selected from a first set of positions and a second set of positions. In the first set of switch positions, the one or more non-tunable antennas are configured for transmission and reception. In the second set of switch positions, the one or more non-tunable antennas are configured for transmission and the two or more narrowband antennas are configured for Multiple Input Multiple Output (MIMO)-diversity reception.

Communication standards that may be supported by the antenna system of the invention are not limited to any one of the following: Global System for Mobile Communications (GSM), Universal Mobile Telecommunication System (UMTS)/Wideband Code Division Multiple Access (WCDMA), Long Term Evolution (LTE), CDMA2000, Wi-Fi, Wi-Max, Global Positioning System (GPS), and Bluetooth.

Various configurations of the antenna system and/or RF front end may differ from each other either in the communication standard of use, the frequencies of operation for transmission and/or reception, or both. For example, the antenna system and/or RF front end may support GSM 850 in a first configuration, GSM 900 in a second configuration and UMTS 850 in a third configuration. The first and second configurations use the same communication standard, i.e. GSM, but differ in their frequency ranges for transmission and reception, as GSM 850 has a transmission band of 824 to 849 MHz, and a receive band of 869 to 894 MHz, while GSM 900 has a transmission band of 880 to 915 MHz and a receive band of 925 to 960 MHz. The first and third configurations, however, use the same frequency ranges for transmission and reception but differ in the communication standard of use.

For further illustration, a fourth configuration supports GSM1800 with a transmission band of 1710 to 1785 MHz, and a reception band of 1805 to 1880 MHz; and a fifth configuration supports LTE1700 with a transmission band of 1710 to 1755 MHz and a reception band of 2110 to 2155 MHz. These configurations differ both in their reception bands and communication standards, but share part of their transmission bands.

Figure 1:
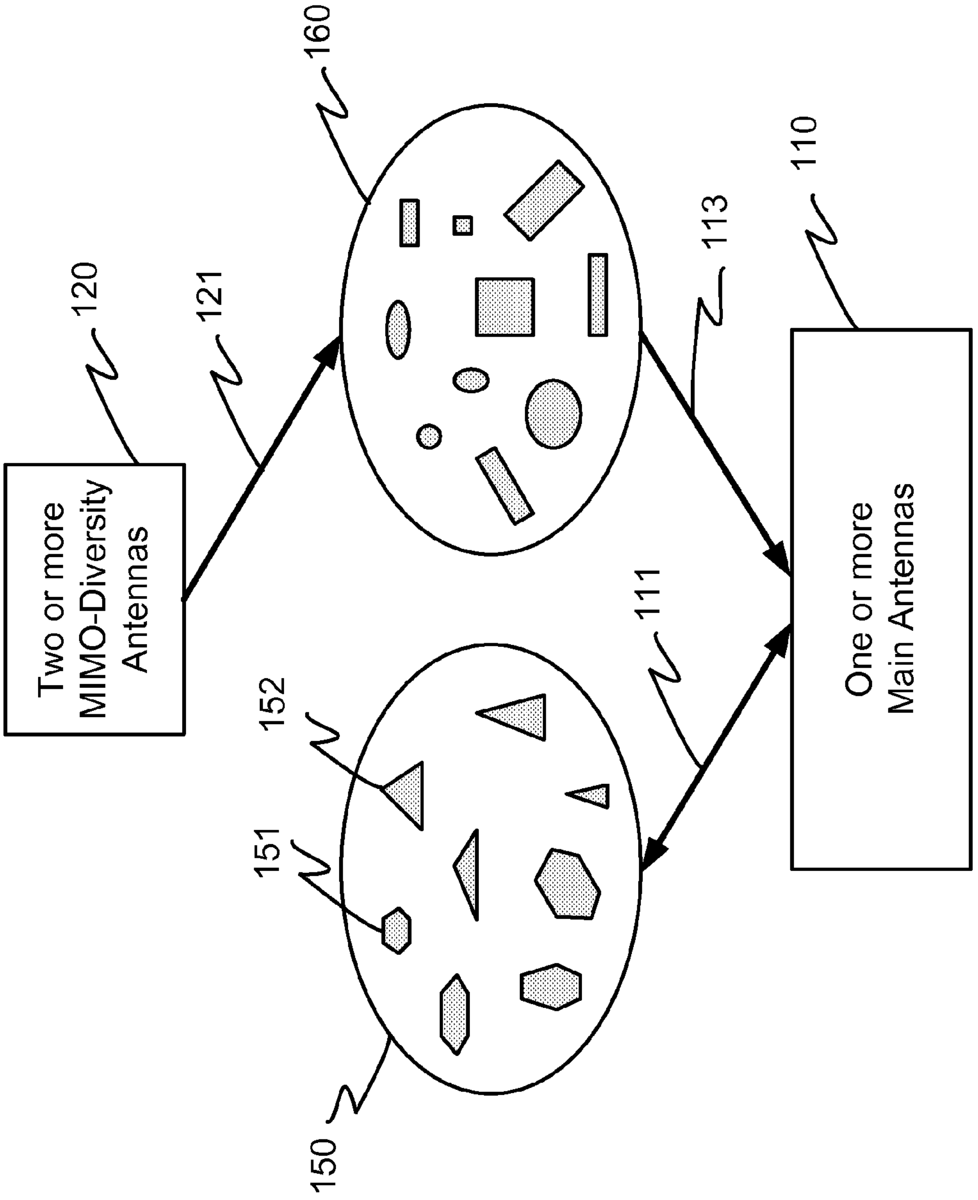
FIG. 1 illustrates schematically an antenna system for communication in various configurations, in accordance with embodiments of the invention.

FIG. 1 shows a functional schematic diagram of the antenna system according to embodiments of the invention. Both transmission and reception in the first set of configurations 150 (which includes individual configurations 151, 152, . . . etc.) is achieved using the one or more first antennas 110. The bi-directional arrow 111 between the first set of configurations 150 and the one or more first antennas 110 indicates that both transmission and reception of the first set of configurations 150 is supported by the one or more first antennas 110. For ease of reference only, the one or more first antennas 110 are referred to by the term 'main antennas' herein after. A worker skilled in the art would appreciate that the term 'main antenna' does not indicate the relative significance and/or size of the antenna or the configurations supported thereby. The main antennas 110 also handle transmission for the second set of configurations 160 as indicated by the unidirectional arrow 113. The reception 121 for the second set of configurations 160 is handled by the two or more second antennas 120 configured for MIMO-diversity reception, and hereinafter referred to as 'MIMO-diversity antennas', for ease of reference only.

In some embodiments, the main antennas 110 are a plurality of narrow-band antennas. In other embodiments, the main antenna 110 is a single wideband antenna.

In some embodiments, the main antennas 110 are non-tunable. In some embodiments, the MIMO-diversity antennas 120 are tunable. In further embodiments of the invention, the MIMO-diversity antennas are tunable allowing for change in the shape, bandwidth and/or center frequency of their band of operation.

In some embodiments, some of a plurality of antennas are operable in disjoint groups of configurations. For example, when the main antennas 110 are a plurality of narrow-band and/or non-tunable antennas, a first one of the main antennas may be operable in a first group of configurations, and a second one of the main antennas may be operable in a second group of configurations, where there is no configuration common to the first group and the second group. As a further example, first and second non-tunable antennas may be provided which are operable in different frequency ranges or with different protocols or other characteristics, which are not typically used simultaneously. Therefore, in a first group of configurations, the first non-tunable antenna may be used, whereas in a second, disjoint, group of configurations, the second non-tunable antenna may be used. Referring to FIG. 1, these first and second disjoint groups of configurations may each comprise configurations selected from the union of the first set of configurations 150 and the second set of configurations 160, for example.

The main antennas 110 may support diversity transmission in some of the configurations of the first set of configurations 150 and the second set of configurations 160, by the simultaneous use of multiple antennas for transmission of the same signal. In some embodiments, the main antennas 110 support diversity transmission in the second set of configurations 160, thus allowing for diversity on both the downlink (receive) and uplink (transmit) directions for the second set of configurations 160.

In some embodiments, transmit antennas are chosen from a plurality of main antennas based on the frequency band of interest. In embodiments, the main antennas comprise a low band antenna and a high band antenna. For example, the low band antenna may be operable with respect to a frequency range lower than that of the high band antenna. The frequency ranges of each antenna may be overlapping or non-overlapping.

Figure 2:
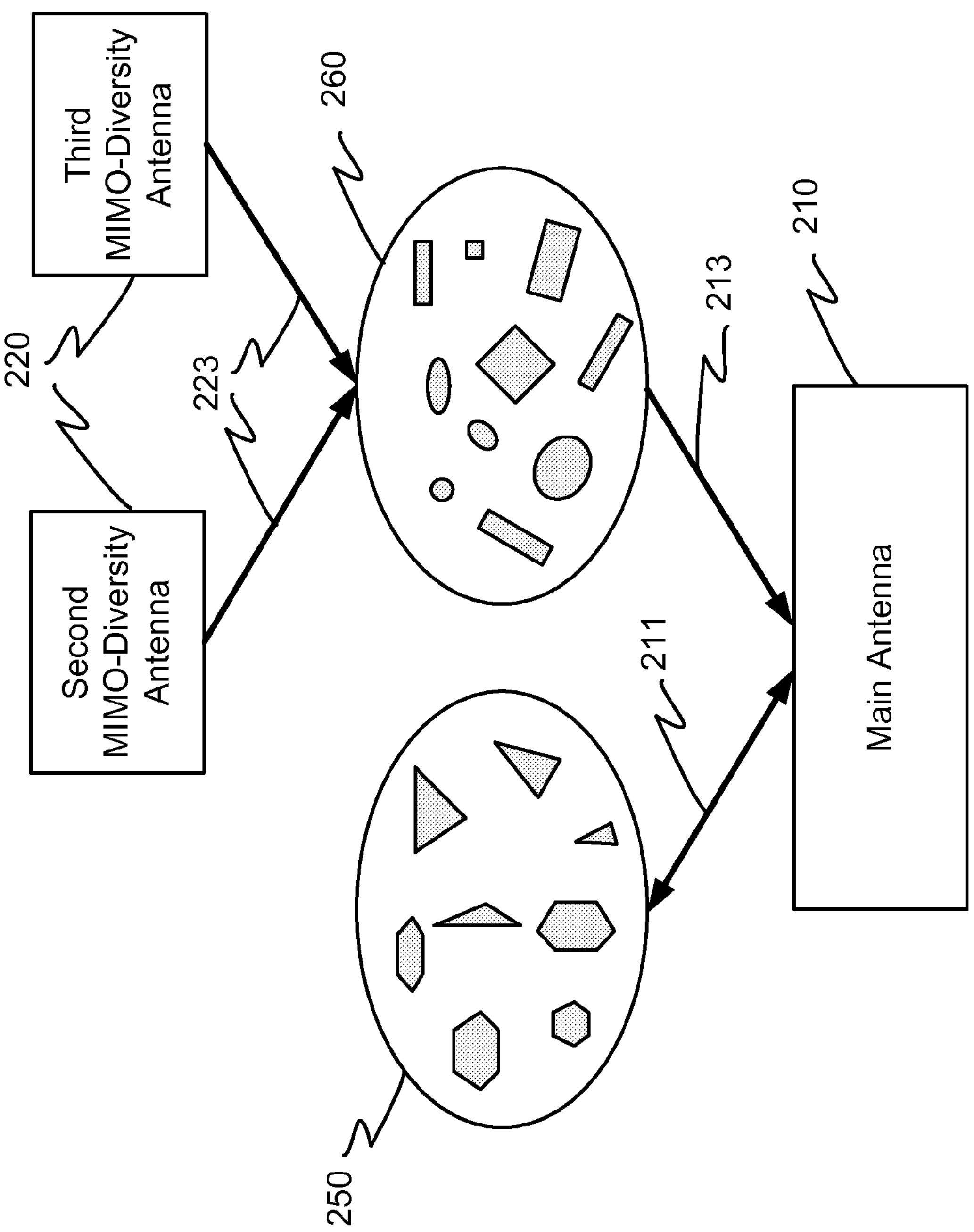
FIG. 2 illustrates schematically an antenna system configured to provide two MIMO-diversity receive paths for a set of configurations, in accordance with embodiments of the invention.

In embodiments of the invention, the antenna system comprises three antennas, an example of which is illustrated in FIG. 2. A single main antenna 210 is used for transmission and reception in a first set of configurations 250, as shown by the bi-directional arrow 211, and for transmission 213 only in a second set of configurations 260, while a second antenna and a third antenna are used as MIMO-diversity antennas 220 to provide MIMO-diversity reception 223 in the second set of configurations 260. The schematic of FIG. 2 is designed for the scenarios where two receive paths are used for MIMO diversity reception. The two receive paths may be configured with similar receive gains.

While LTE communications standards require at least two receive paths for MIMO-diversity reception, additional ones may be specified for higher data throughput. In one embodiment, four receive paths are used for MIMO diversity reception. Higher numbers of receive paths may be used for MIMO diversity reception in one or more of the configurations of the second set of configurations. A worker skilled in the art would appreciate that the configurations of the second set of configurations may not all use the same number of receive paths for MIMO-diversity reception. For example, a first configuration in the second set of configurations may use a MIMO-diversity factor of two for signal reception, while a second configuration in the second set of configurations may use a MIMO-diversity factor of four for signal reception.

In some embodiments, the MIMO-diversity antennas are configured to provide diversity reception. In some embodiments, the MIMO-diversity antennas are configured to provide MIMO reception. A worker skilled in the art will understand that the MIMO-diversity antennas may aid in beam-forming, space-time coding, MISO, SIMO and/or serve as smart antennas etc. For MIMO reception, the MIMO-diversity antennas are preferably substantially matched and orthogonal with low envelope correlation (i.e., coupling, isolation) coefficients there-between. MIMO-diversity antennas may further employ diversity techniques such as spatial antenna diversity, time diversity, frequency diversity, polarization diversity, pattern diversity, modal diversity, or the like to provide plural radio communication paths with respect to time, space, or both. Diversity may further provide for improved communication quality or bandwidth, for example by providing and advantageously using plural redundant communication paths, as would be readily understood by a worker skilled in the art.

In some embodiments of the invention and referring to FIG. 1, the MIMO-diversity antennas 120 may be configured to support diversity or MIMO reception in multiple frequency bands, for example, in both 900 MHz and 2 GHz frequency ranges. In embodiments, at least two of the MIMO-diversity antennas 120 may operate in a frequency band which is different from the remainder of the MIMO-diversity antennas 120. A worker skilled in the art would appreciate that for MIMO-diversity antennas 120 operational in different frequency bands, ganged switches may be used that allow for simultaneous connection of multiple paths. Ganged switching may be implemented mechanically, electromechanically, or using solid state electronics, as would be readily understood by a worker skilled in the art.

With further reference to FIG. 1, a worker skilled in the art would appreciate that multiple receive paths (diversity, MIMO or otherwise) can be bundled together in the branching circuit of the RF front-end and routed to a separate antenna. In some embodiments, multiple transmit paths and/or multiple non-diversity receive paths may be handled by a main antenna dedicated thereto. This approach can allow for the tailoring of the physical designs of the main antennas for enhanced antenna performance and/or compactness. Thus, embodiments of the invention can offer an effective solution for support of diversity and MIMO reception.

Antenna Design

A worker skilled in the art would appreciate that the physical implementation of the antenna system would need to take into account various design criteria, not limited to one or more of the following: (1) Implementing effective antennas that are small relative to the wavelengths of the signals transmitted and/or received; (2) Making the antennas fit within a desired form factor, for example compact housing with transceiver electronics, which due to the relative close proximity may be a potential cause of interference; (3) Making the antennas operate effectively at a plurality of frequency bands (e.g. in the range from 700 MHz to 2500 MHz, or other allocated bands); (4) Implementing a plurality of receiver antennas that have nominally equal reception capability that receive de-correlated signals at the same time, and that do not couple closely with each other. In addition, various performance metrics of the antennas may be desired, for example, impedance bandwidth, efficiency and gain, may need to fall with a desired range.

A worker skilled in the art will appreciate that the invention is not limited to a specific antenna design, but may incorporate well-known antenna designs that have been utilized for wireless terminals. Thus, the antennas (both main and MIMO-diversity antennas) utilized in the antenna system of the invention may have a wide choice of physical implementations: e.g. Planar Inverted F antennas (PIFA), patch antennas, meandered monopole antennas, loop antennas, helical antennas, fractal antennas, slot antennas or micro-strip antennas may be used in the antenna system.

In embodiments of the invention, various performance metrics of the MIMO-diversity antennas (e.g. correlation coefficient between MIMO antennas, mean-effective gain of individual MIMO antennas and the ratio of the mean-effective gains of combined MIMO antennas) may fall within a desired range.

Typically, tunability of antennas has been used in antenna systems to enhance flexibility and/or reduce the total number of antennas. Tunability in the frequency of operation of antennas can be obtained by various means. For example, reconfigurable antennas can be designed with switchable elements to change the resonant frequency, or the type of antenna; and/or with switchable or tunable impedance matching for changing the resonant frequency or dynamically optimizing the return loss of the antenna for different bands.

In some embodiments, tuning to a different frequency range may be achieved by adding or removing components electrically. In embodiments, electrical tuning elements such as PIN diodes may be used. In embodiments, RF semiconductor switches or RF micro-electromechanical switches (MEMS) may be used.

In some embodiments, tuning of the antenna may be achieved by tuning its inductance, capacitance, electrical size, or a combination thereof. In embodiments, tuning of inductance, capacitance or electrical size may be achieved mechanically using sliding or rotating parts. In some embodiments, these parameters may be tuned without the use of moving parts. For example, PIN diodes can be used as switches to electrically connect or disconnect extra parts to an antenna, thus likely changing its size, inductance and capacitance simultaneously. Various types of diodes or semiconductor technologies can also be used as electrically variable capacitors for tuning antennas. In embodiments, a varactor (a semiconductor diode that exhibits variable capacitance) can be controlled by applying a varying voltage to its electrodes. Antennas can be tuned also by switching in or out inductances.

A worker skilled in the art will appreciate that the elements for tuning (e.g. RF switches, diodes etc. may be controlled by electrical, optical, electrostatic or magnetic or other appropriate means.

A worker skilled in the art would appreciate that tunability may be easier to achieve in receive-only antennas such as the MIMO-diversity antennas, as the higher power levels used for transmission can cause switching devices to become non-linear which may result in undesirable effects which may include signal distortion and/or generation of signals outside the allocated channels. Design of tuning or switching devices for a transmit antenna must account for any constraints on size, cost or power supply parameters.

Various design methodologies can be used to obtain an antenna system operational for a wide frequency band. The wideband operation of an antenna may be achieved by using the various frequency modes of the antenna. In embodiments, one or more of the antennas of the antenna system are configured such that they are naturally resonant at a fundamental frequency mode and a higher order resonant mode that is a multiple of the lower frequency. The geometry of the antenna can also be designed to allow operation on different frequencies by connecting to the antenna at different locations thereon. However, for the above approaches, the performance on at least one of the desired frequencies of operation may be compromised if the desired frequencies do not have the necessary numerical relationships.

Another method for configuring an antenna to be a wideband antenna is to make use of fractal or self-similar geometry. For example, a pattern containing small elements can have good characteristics at a high frequency but due to a repeating pattern of shapes of increasing size they can also couple together to work at a succession of lower frequencies.

Broad-band operation may also be achieved using other designs. For example, log periodic antennas have dipoles of different lengths arranged in a row and coupled to a common feed point to achieve wideband operation. Broad band Yagi antennas have a single dipole with a reflector and a range of "director" elements with spacing between them or lengths designed to increase the bandwidth over which the dipole will work to a range of higher frequencies. Spiral, conical, fractal, and other substantially self-similar antenna configurations are also known to facilitate broad-band operation. A dipole antenna may have a fan shape to increase its bandwidth.

Yet another method for operating an antenna over a wide bandwidth involves modal diversity. This approach involves exciting a multi-resonant antenna structure in different ways or with respect to different feedpoint locations to obtain different resonant antenna responses. For example, a modal diversity-enabled antenna may be operable in a first frequency range when driven or monitored at a first feedpoint, and may be operable in a second frequency range when driven or monitored at a second feedpoint. In some cases, the first feedpoint and second feedpoint may coincide, for example an antenna may be operable in frequency bands with center frequencies f, 2f etc. Modal diversity may be implemented in conjunction with appropriate filtering at the antenna, RF front end, or transceiver.

Many of these techniques require a lot of space and only radiate within specific narrow angles and or have specific polarisation. A worker skilled in the art would readily appreciate that some communication standards may only require MIMO-diversity reception in a select few bands of narrow bandwidth. For example, LTE standards only require MIMO-diversity reception in narrow bands. As narrow-band antennas are typically smaller than wideband antennas, compactness may be achieved utilizing the antenna system according to embodiments of the invention.

The frequency bands and communications standards as illustrated in FIG. 4 require support of MIMO-diversity reception only for three higher frequency bands, i.e., 1930 to 1990 MHz, 2110 to 2155 MHz and the overlapping band of 2110 to 2170 MHz and three lower frequency bands, i.e. 728 to 746 MHz, 869 to 894 MHz and 925 to 960 MHz.

The MIMO-diversity antennas therefore may be designed using multi-resonant narrow-band structures, or using reconfigurable antennas to support multiple reception bands. In embodiments, the MIMO-diversity antennas are multi-resonant, narrow-band and electrically tunable. In some embodiments, the MIMO-diversity antennas are resonant in dual bands, and allow for tuning of both the low frequency band and the high frequency band. In some embodiments, multi-resonance may be associated with modal diversity.

Methods are known, to those skilled in the art, for making antennas that are physically small relative to the wavelengths of the signals they are required to receive and transmit. These antennas are known as electrically small antennas, and have been described in detail in various publications such as the following, which are herein incorporated by reference: (1) "Fundamental Limitations of Small Antennas", IEEE Vol. 69, pages 1479-1484, December 1947, by H. A. Wheeler; (2) "Physical Limitations of Omni-Directional Antennas@", J. Appl. Phys., Vol. 19, pages 1163-1175, December 1948, by L. J. Chu; (3) "Effects of Antenna Size on Gain, Bandwidth, and Efficiency@", J. Res. Nat. Bureau of Standards, Vol. 64-D, pages 1-12, January/February 1960 by R. F. Harrington; (4) "Evaluation of Antenna Q@", IEEE TAP Vol. 12, pages 23-27, January 1964 by R. E. Collin and S. Rothchild; (5) "Quality Factor of General Ideal Antennas@", IEEE TAP Vol. 17, pages 151-155, March 1969 by R. L. Fante; and (6)

"Fundamental Limitations in Antennas@", IEEE, Vol. 69, pages 170-182, February 1981 by R. C. Hansen.

A worker skilled in the art will readily understand that the close proximity of an antenna to other objects can impact its various parameters including but not limited to the frequency of best operation, the direction of radiation and the effectiveness. The antenna design may be optimized for the desired environment by taking into consideration the effects of closely located materials and/or objects. Furthermore, the frequency of operation can be adjusted and direction of operation can even be used as an advantage, for example, when radiating away from the user, when configuring MIMO-diversity antennas to radiate in different directions, polarizations and/or other manners to create dissimilar fading conditions and/or not to couple radiation patterns to each other.

RF Front End: Design

The joint design of the antennas and the RF front end (the feed circuitry, branching circuitry etc.) may be used to substantially reduce interference caused by electronics located proximal to the antenna system. In embodiments, the antenna system and branching circuitry may be integrated.

The impact of noise generated by electronic circuits in close proximity to the antennas may be reduced by a variety of techniques and associated apparatus. These techniques can include but are not limited to: (a) choosing operating frequencies for the electronic circuits that are outside the frequency bands of the antenna; (b) shielding noisy circuits e.g. using metal enclosures to form a Faraday cage, or using filter circuits or appropriate signal processing on noisy inputs and outputs; (c) cancellation of potentially interfering signals using common and differential modes of operation, and/or the like.

In one embodiment, noise generating signals that have to be passed from one part of a system to another are driven differentially on two parallel connections rather than as a single signal connection relative to a common ground. By this method the common ground may not have the interfering signal superimposed upon it, and therefore can enable an antenna sharing the ground to be better isolated.

The RF front end may utilize a plurality of different types of amplifiers at desired locations in the signal paths. For example, low noise amplifiers (LNA) can be used in receive paths to amplify the signal received at the antenna, as the strength of the received signal is weak in comparison to the strength of a transmitted signal and that a substantially maximal signal-to-noise ratio (SNR) can be obtained by ensuring that minimal amounts of noise are added during amplification. As another example, power amplifiers (PA) with higher output saturation powers can be used in transmit paths, as obtaining high signal strengths for transmission is of greater significance.

Various types of band pass filters may be used in the design of the RF front end including but not limited to Surface Acoustic Wave (SAW) filters, Bulk Acoustic Wave (BAW) filters, waveguide/cavity filters, ceramic filters, micro-strip filters and micro-electro mechanical (MEM) filters. The band pass filters are configured to substantially eliminate out-of-band noise and interfering signals, which can improve the overall performance of the antenna system. A worker skilled in the art would readily appreciate that different filter technologies may differ in size, insertion loss, or other parameters.

A worker skilled in the art would appreciate that additional components may be used in the design of the RF front end including but not limited to switches, and matching components (e.g. transformers, baluns). Switches may be RF switches such as solid state switches, electromechanical switches, PIN diode switches, MEMS switches, or other appropriate switches as would be readily understood by a worker skilled in the art.

Switches connect the various parts selectively to antennas and isolate the unused parts. For example, the switch 502 in FIG. 5, switches between transmitting and receiving circuits that cannot be simultaneously connected to the antenna.

A worker skilled in the art would appreciate that RF transformers may be implemented at various RF frequencies as short parallel traces on a circuit board, and may ensure enhanced energy transfer between components of differing impedances. Transformers may be particularly effective over specific ranges of frequencies. Baluns are transformers that connect the balanced (e.g. twin wire) and unbalanced (signal and ground) RF transmission lines.

In some embodiments, some switches may be replaced using filters or more separate antennas. The switches provide high isolation especially of sensitive receiver amplifiers from high transmitter amplifier outputs that would otherwise damage them. Using separate antennas would not be a solution to separating transmitters and receivers as the antennas would couple at a high level.

The invention will now be described with reference to specific examples. It will be understood that the following examples are intended to describe embodiments of the invention and are not intended to limit the invention in any way.

EXAMPLES

Example 1

This example is directed to an antenna system and associated RF front end for a mobile wireless communications terminal supporting, at least partially, the explicit frequency bands and the communications standards shown in FIGS. 3 and 4, and outlined below. Generally, the acronyms below specify a type of communication standard to be employed as a three- or four-letter acronym, followed by a nominal center frequency to be used. Associated transmit and receive frequency bands currently in use are further listed after each acronym. It is to be understood that the invention may be similarly employed to operate using communication standards and frequency bands other than those listed below.

| | | |
|---|---|---|
| LTE700: | 698-716 MHz Transmit | 728-746 MHz Receive |
| GSM850: | 824-849 MHz Transmit | 869-894 MHz Receive |
| UMTS850: | 824-849 MHz Transmit | 869-894 MHz Receive |
| GSM900: | 880-915 MHz Transmit | 925-960 MHz Receive |
| UMTS900: | 880-915 MHz Transmit | 925-960 MHz Receive |
| LTE900: | 880-915 MHz Transmit | 925-960 MHz Receive |
| GSM1800: | 1710-1785 MHz Transmit | 1805-1880 MHz Receive |
| GSM1900: | 1850-1910 MHz Transmit | 1930-1990 MHz Receive |
| UMTS1900: | 1850-1910 MHz Transmit | 1930-1990 MHz Receive |
| UMTS2100: | 1920-1980 MHz Transmit | 2110-2170 MHz Receive |
| LTE2100: | 1920-1980 MHz Transmit | 2110-2170 MHz Receive |
| LTE1700: | 1710-1755 MHz Transmit | 2110-2155 MHz Receive |

The frequency bands can be broadly grouped into those in a lower range of 700 MHz to 1 GHz and an upper range of 1.7 GHz to 2.2 GHz. These frequency bands are not intended to be restrictive on the disclosure and frequencies that may be accommodated using the invention, but are merely being identified as an example.

Figure 5:
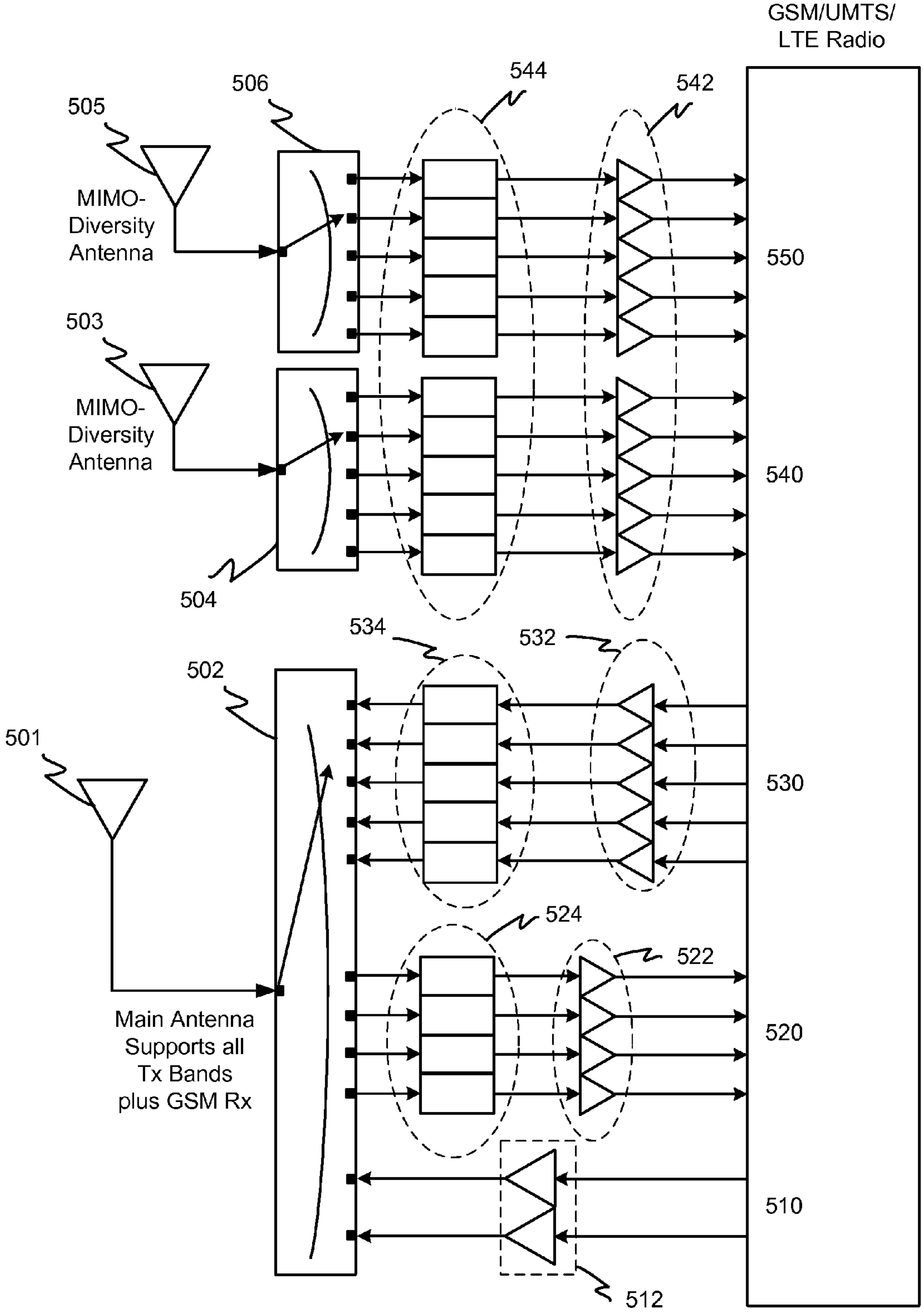
FIG. 5 shows an antenna system and RF front-end which at least partially supports the frequency bands of operation illustrated in FIG. 4, according to embodiments of the invention.

FIG. 5 shows an exemplary block diagram of an antenna system and RF front end according to embodiments of the invention designed to support quad-band GSM, quad-band UMTS and quad-band LTE, as shown in FIG. 4. The overlapping UMTS and LTE bands results in five-band groups for UMTS and LTE standards.

This example antenna system utilizes three antennas—one main antenna 501 and two MIMO-diversity antennas 503, 505. The main antenna 501 is used for both transmission and reception in a first set of configurations, defined for this example as the configurations that do not utilize MIMO-diversity reception. For configurations of a second set of configurations, defined for this example as the configurations that utilize MIMO-diversity reception, the main antenna 501 is used for transmission only while two additional MIMO-diversity antennas 503, 505 are used for MIMO-diversity reception.

This first set of configurations comprises the following GSM configurations: GSM 850, GSM 900, GSM 1800, and GSM 1900; while the second set of configurations comprises the following UMTS/LTE configurations: LTE 700, UMTS 850, LTE 1700, UMTS/LTE 900, UMTS 1900 and UMTS/LTE 2100.

The two transmitters 510 are connected to two GSM power amplifiers (PA) 512 that transmit by grouping the transmission frequencies of the first set of GSM configurations into the lower and the higher frequency bands. The lower band supports both GSM 850 and GSM 900, while the higher band supports GSM 1800 and GSM 1900. A worker skilled in the art would appreciate that the PAs 512 may also support Enhanced Data Rates for GSM Evolution (EDGE) standards.

The four receivers 520 are GSM receivers that cover the corresponding four GSM reception bands. Each low noise amplifier (LNA) 522 is preceded by a RF band pass filter 524 (e.g. Surface Acoustic Wave (SAW) filter) that excludes frequencies outside its band. Both the GSM transmitters 510 and the four GSM receivers 520 are connected to the main antenna 501.

The five transmitters 530 are connected to five PAs 532 that connect to the main antenna 501 and support the second set of UMTS/LTE configurations. RF filters 534 may also be used in the transmit paths. The five receivers 540 and the five receivers 550 are connected to the MIMO-diversity antennas 503, 505 respectively, and cover the corresponding UMTS/LTE reception bands.

With further reference to FIG. 5, the RF front end uses a main single-pole multi-throw RF switch 502 to connect the single main antenna 501 to all the transmit paths 510, 530 as well as the non-MIMO-diversity (i.e., GSM) receive paths 520. Single-pole multi-throw RF switches 504, 506 and a number of RF filters 544 (e.g. SAW filters) and LNAs 542 connect the MIMO-diversity receive paths 540, 550 to the MIMO-diversity antennas 503, 505. In this manner the main antenna 501 supports all transmit paths and the GSM receive paths, while the MIMO-diversity antennas 503, 505 support the MIMO-diversity receive paths 540, 550 for UMTS/LTE. A worker skilled in the art would appreciate that the antenna system of FIG. 5 does not require duplexer filters and diplexers, which are commonly found in the designs for prior art antenna systems.

A worker skilled in the art would readily understand that the switches 504 and 506 may be ganged, to allow for simultaneous switching at a commonly shared command. The switches 504, 506 may therefore be considered as a double pole five throw (DP5T) switch.

The single main antenna 501 is a wide-band antenna as it needs to support all the transmission frequency bands and the non-MIMO-diversity receive frequency bands, and therefore occupies a relatively larger physical volume. However, the MIMO-diversity antennas 503, 505 only need to be preferably matched to each other, and not to the main antenna 501 to support MIMO reception. The MIMO-diversity antennas 503, 505 also have narrower bandwidth when compared to the main antenna 501. Therefore, MIMO-diversity reception can be achieved using the configuration of FIG. 5 in compact form-factors.

Example 2

For the frequency bands and communications standards of FIG. 4, the number of frequency bands that require support of MIMO-diversity reception include three higher frequency bands, i.e., 1930-1990 MHz, 2110-2155 MHz and 2110-2170 MHz and three lower frequency bands, i.e., 728-746 MHz, 869-894 MHz and 925-960 MHz. As such, this example is directed to an antenna system and RF front end that supports MIMO-diversity reception at least partially in the bands of FIG. 4, and is implemented using multi-resonant narrow-band MIMO-diversity antennas that are reconfigurable.

In some embodiments, the MIMO-diversity antennas may be simplified as a higher frequency band requiring MIMO reception is virtually the same the world over, and two lower frequency bands requiring MIMO reception are relatively close together and only one of those is in use in any region of the world. For example and with reference to FIG. 3, MIMO-diversity reception is required on three of the defined receive bands 303, with MIMO-diversity reception on the highest band 306 required in all parts of the world, the lowest band 304 required only in North America, and band 305 not required in North America. A worker skilled in the art would appreciate that the antenna system and/or RF front end of the invention can be readily extended to other bands, currently being defined by various standard and regulatory organizations.

Figure 6:
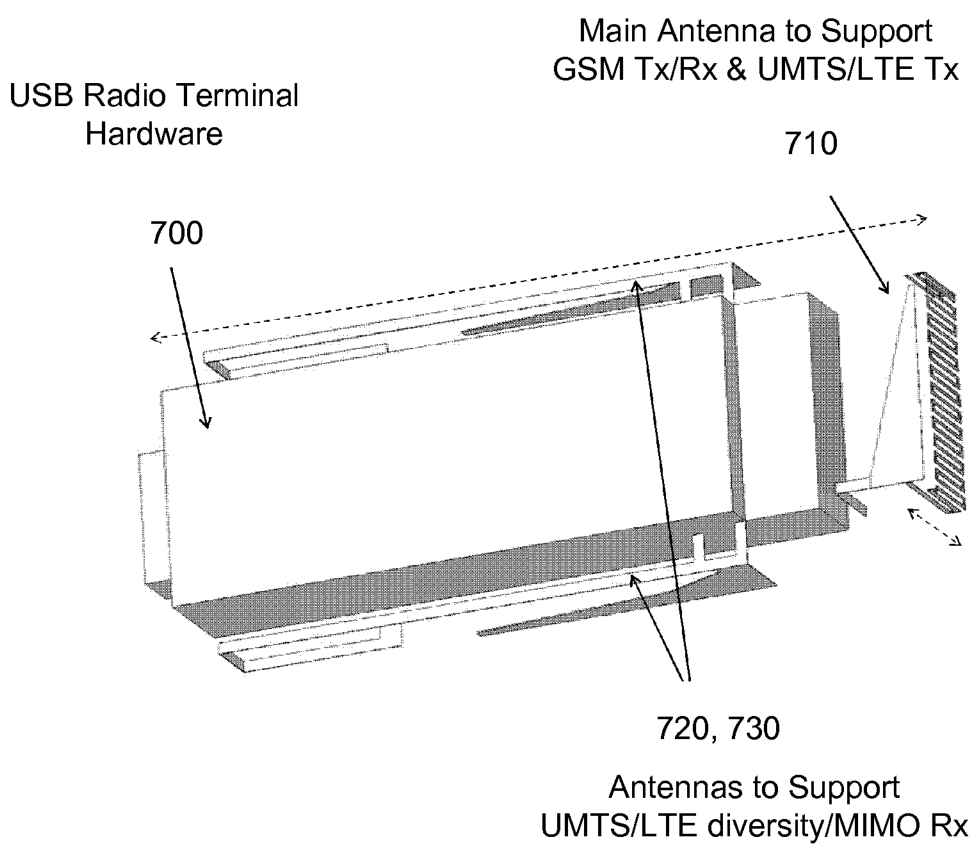
FIG. 6 illustrates an exemplary physical implementation of antennas for an antenna system that at least partially supports the frequency bands of operation illustrated in FIG. 4, according to embodiments of the invention.

With reference to FIG. 6, this example is directed to a specific physical implementation of the antenna system for a wireless communications device 700. A worker skilled in the art would readily understand that the main antenna and MIMO-diversity antennas of the invention are not limited to the physical implementations of this example.

FIG. 6 illustrates a USB "stick" type wireless communications device 700 such as a wireless adapter (referred to as 'USB device' hereinafter), which utilizes a main antenna 710 for transmitting and receiving and two MIMO-diversity receiver antennas 720, 730 for MIMO-diversity reception. The MIMO-diversity receiver antennas 720, 730 are positioned on either side of the USB device 700 and the main antenna 710 is on the end. The main antenna 710 is a meandered monopole, implemented as a printed trace folded in a zig-zag form. The MIMO-diversity antennas 720, 730 are PIFAs, as are known in the art.

The example USB device as FIG. 6 can at least partially support the frequencies and communications standards illustrated in FIG. 4, i.e., this USB device can support quad-band GSM, quad-band UMTS and quad-band LTE. Each of the MIMO-diversity antennas 720, 730 is a dual-band antenna that supports an upper frequency band and a lower frequency band. In embodiments, the lower frequency band is tunable to achieve broad geographic or even worldwide coverage. If operation in a limited geographic region is acceptable, the lower frequency band of the MIMO-diversity antennas 720, 730 may be fixed. A worker skilled in the art would readily understand that relatively good performance for two relatively narrow bands of frequencies is more readily realisable in a small space than one that covers a broad range of frequencies. Thus, the antenna system of the invention can facilitate achieving the objective of MIMO reception together with broad frequency coverage, using electrically small antennas, with reduced complexity and cost when compared to solutions currently available.

Figure 7:
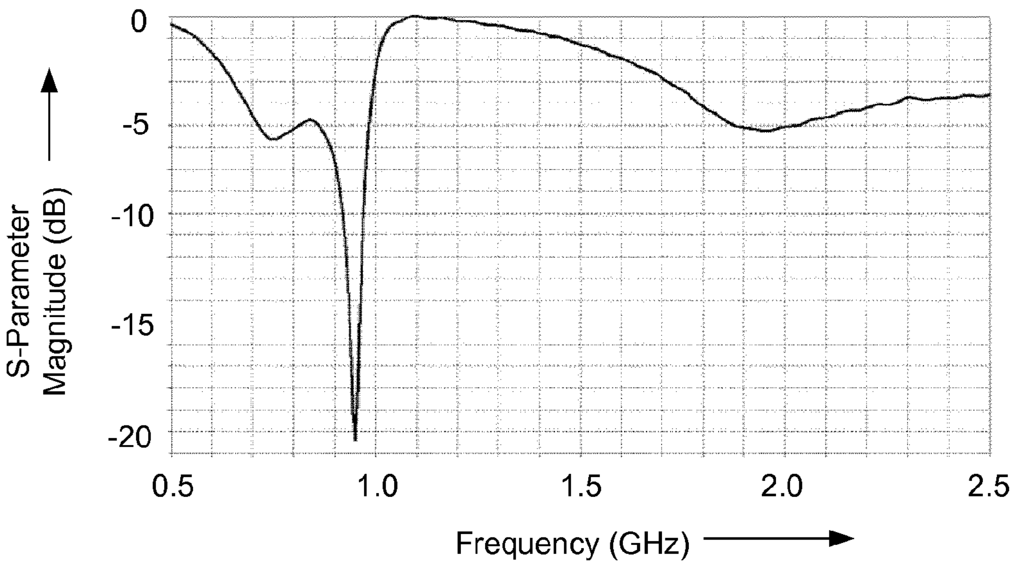
FIG. 7 shows the frequency response of the main antenna and the MIMO-diversity antennas of the antenna system of FIG. 6.
Figure 7:
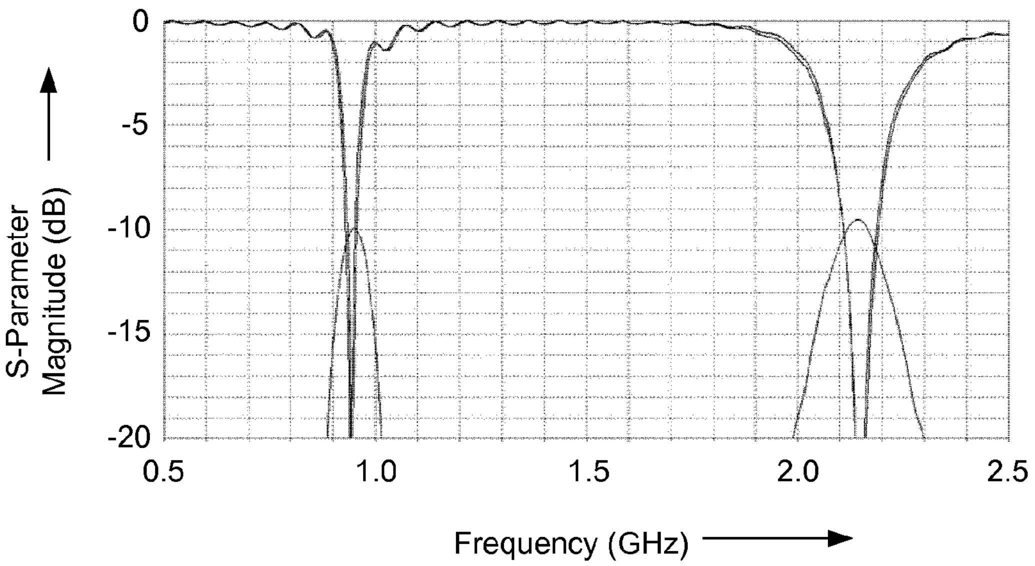

With reference to FIG. 7A, this figure shows the frequency response of the return loss of the exemplary main antenna 710 located at the end of the USB device 700. The main antenna 710 supports operation in the frequency ranges from 690 MHz to 990 MHz and from 1.8 GHz through to 2.2 GHz. Furthermore, FIG. 7B shows the frequency response of the return loss of either of the MIMO-diversity receiver antennas 720, 730, and shows the capability for reception on a high frequency band and a low frequency band without frequency tuning. This indicates a multi-resonant property of the antennas 720, 730, for example. The lower traces illustrated in FIG. 7B indicate that the isolation between the MIMO-diversity receiver antennas 720, 730, is about −10 dB.

Figure 8:
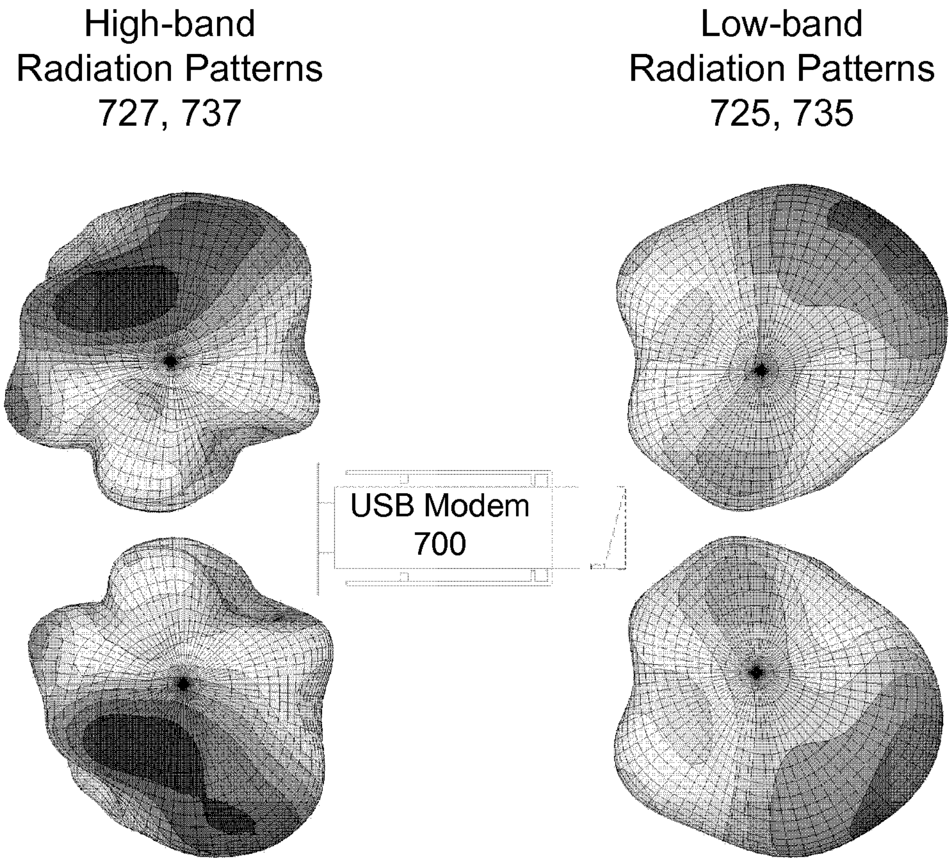
FIG. 8 shows the far field radiation patterns of the MIMO-diversity antennas of the antenna system of FIG. 6.

In addition, FIG. 8 shows the three dimensional (3D) far field radiation patterns of the MIMO-diversity antennas 720, 730 at the higher and lower frequency bands. The high-band radiation patterns 727, 737 are shown on the left, while the low-band radiation patterns 725, 735 are shown on the right. The darker areas show the directions with stronger antenna reception. A worker skilled in the art would appreciate that the radiation patterns are substantially independent of each other. Furthermore, the MIMO-diversity antennas 720, 730 exhibit orthogonality both on low-band and high-band, with substantially independent radiation patterns.

In one embodiment, the various parameters of the MIMO-diversity antennas 720, 730 are as follows, and are sufficient to ensure good MIMO performance for the design:

Efficiency in low band: More than 50% (e.g. 60%)
Efficiency in high band: More than 50% (e.g. 80%)
Envelope correlation coefficient in low band: Less than 0.3 (e.g. 0.2)
Envelope correlation coefficient in high band: Less than or equal to 0.3 (e.g. 0.3)
Mean effective gain in low band: MEG1=MEG2=−4 dB;
Mean effective gain in high band: MEG1=MEG2=−3 dB;

In addition, tuning or switching components such as PIN diodes can be used with the MIMO-diversity antennas 720, 730 to change the dimensions and thus, the resonant frequency of the antennas. In embodiments, a small tuning element is electronically connected and disconnected to the antenna to tune to one or the other of the two lower frequency bands depending on which is desired. In some embodiments, the antennas can be tuned independently for the high and low bands.

Figure 9:
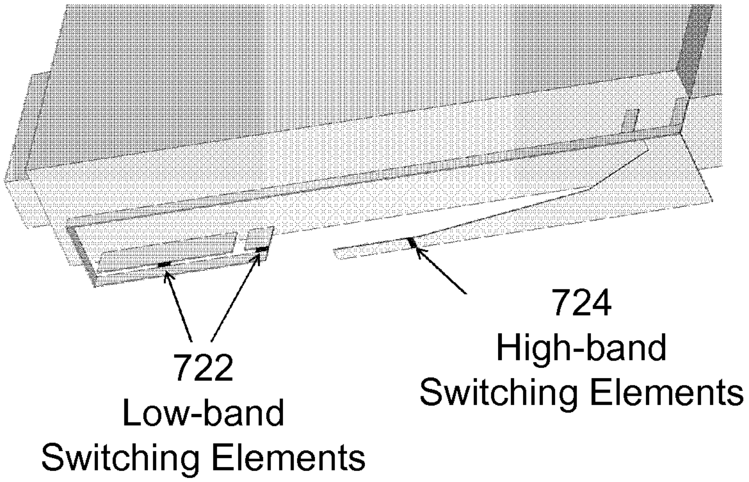
FIG. 9 shows the incorporation of switching elements for tuning the MIMO-diversity antennas of the antenna system of FIG. 6.

FIG. 9 shows the physical arrangement of the tuning components for one of the two MIMO-diversity receiver antennas 720, 730. Separate physical elements 722, 724 are connected to the antenna for changing high band and low band resonances. These physical elements are implemented using switches such as PIN diodes that can be switched by applying DC voltages to them. The application of DC voltages does not affect operation of the antennas at RF frequencies, and can be done through filtering circuits that substantially avoid loss of signal into the voltage supplies.

Figure 10:
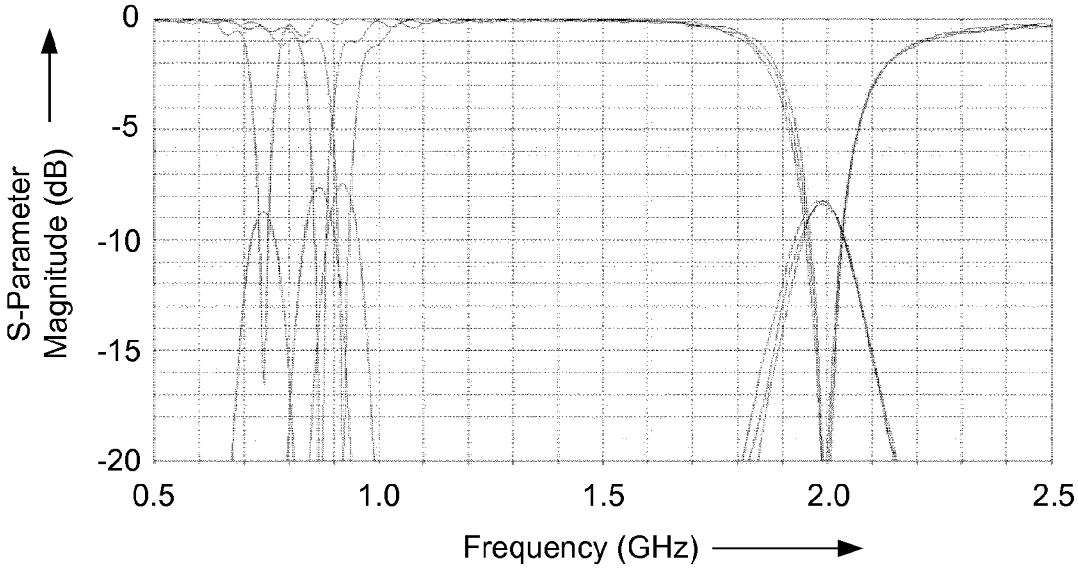
FIG. 10 shows the tuning performance achieved using the configuration of the antenna system of FIG. 9, in accordance with embodiments of the invention.
Figure 10:
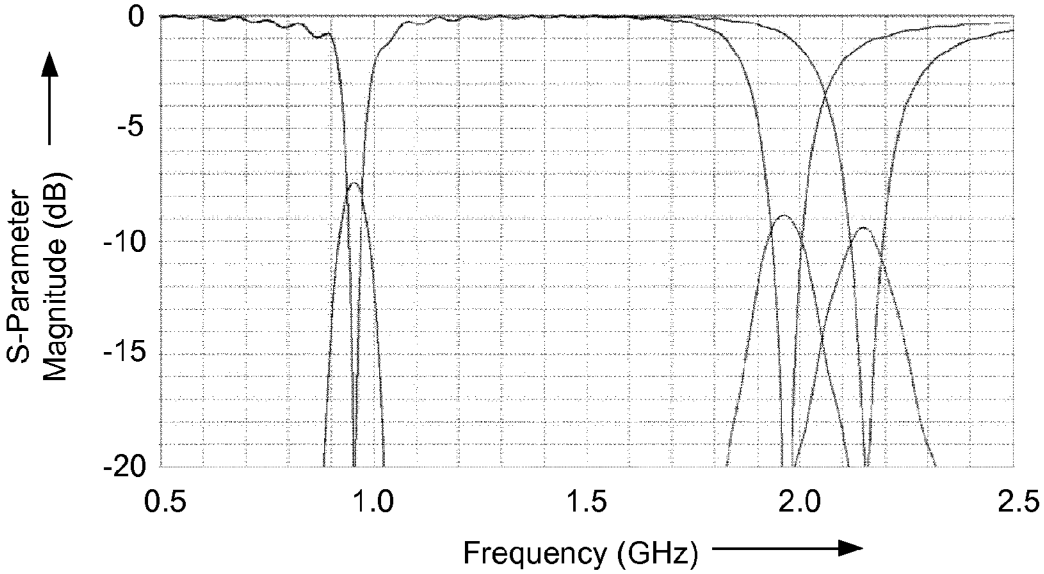

Furthermore, FIG. 10A shows a frequency plot of a MIMO-diversity antenna 720, 730 with its low band frequency response tuned to cover the corresponding low bands for MIMO-diversity and FIG. 10B shows a frequency plot of a MIMO-diversity antenna 720, 730 with its high band frequency response tuned to cover to cover the corresponding high bands for MIMO-diversity.

Example 3

Figure 11:
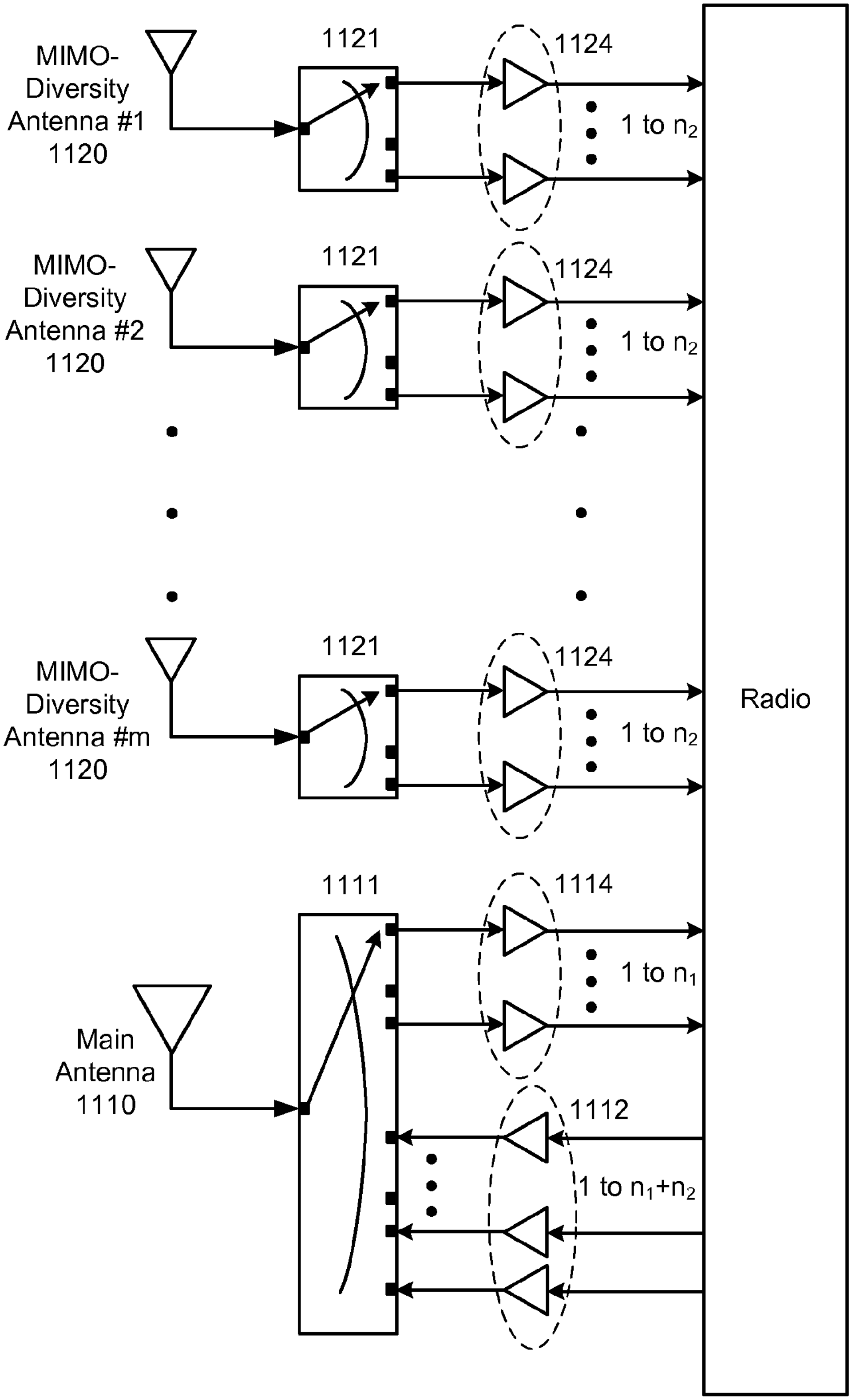
FIG. 11 shows an exemplary schematic of an antenna system configured for an arbitrary number (m>2) of MIMO-diversity receive paths, according to an embodiment of the invention.

FIG. 11 shows an exemplary design of a RF front-end and an antenna system configured to provide MIMO-diversity reception with an arbitrary number (m>2) of MIMO-diversity receive paths, for a second set of configurations consisting of an arbitrary number ($n_2$) of configurations, according to embodiments of the invention. The antenna system is also configured to provide non-diversity reception for a first set of configurations comprising an arbitrary number ($n_1$) of configurations.

A main antenna 1110 supports transmission in all ($n_1$+$n_2$) configurations of the first set and second set of configurations. These transmit paths utilize ($n_1$+$n_2$) power amplifiers (PA) 1112, as shown in the bottom end of FIG. 11. The first set of $n_1$ configurations do not require MIMO-diversity reception and are also supported by the main antenna 1110. The second set of $n_2$ configurations require MIMO-diversity reception, provided by the m MIMO-diversity antennas 1120 with corresponding m receive paths. Low noise amplifiers (LNAs) 1114, 1124 are used in each of the (m×$n_2$)+$n_1$ receive paths. RF switches 1111, 1121 are used as appropriate in the RF front end.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

I claim:

1. An antenna system for operation in conjunction with a radio frequency (RF) front end of a wireless communications device, said antenna system comprising:

one or more non-tunable antennas configurable for transmission and reception in a first set of one or more configurations, and configurable for only transmission in a second set of one or more configurations different from the first set of one or more configurations, wherein configurations in the first and second sets of one or more configurations differ with respect to at least one of frequency band of operation and communication standard of operation; and two or more narrowband antennas configurable for only Multiple Input Multiple Output (MIMO)-diversity reception for the configurations of said second set.

2. The antenna system of claim 1, wherein said communications standards of operation are selected from the group consisting of Global System for Mobile Communications (GSM), Universal Mobile Telecommunication System (UMTS), Wideband Code Division Multiple Access (WCDMA), Long Term Evolution (LTE), CDMA2000, WI-Fi, Wi-Max, Global Positioning System (GPS), and Blue-Tooth.

3. The antenna system of claim, wherein said narrowband antennas are substantially matched, and wherein said narrowband antennas have a desired correlation coefficient therebetween to allow for MIMO reception.

4. The antenna system of claim 3, wherein the correlation coefficient between at least two of said narrowband antennas is less than 0.3.

5. The antenna system of claim 1, wherein at least one of said narrowband antennas is a tunable antenna.

6. The antenna system of claim 5, wherein at least one of said narrowband antennas is an electrically tunable antenna.

7. The antenna system of claim 5, wherein at least one of said narrowband antennas supports operation in multiple frequency bands, and is configured for tuning of the center frequency, bandwidth, and/or shape of at least one of said multiple frequency bands.

8. The antenna system of claim 7, wherein at least one of said tunable antennas is operable in a lower frequency band around 900 MHz and an upper frequency band around 2 GHz.

9. The antenna system of claim 8, wherein said upper frequency band supports reception of signals for UMTS1900, UMTS2100 or LTE1700, and said lower frequency band is tunable for reception of signals for LTE700 or signals of UMTS900, UMTS850 or LTE900.

10. The antenna system of claim 7, wherein the center frequency, bandwidth, or both center frequency and bandwidth of one or more of said multiple frequency bands is independently tunable using PIN diodes.

11. The antenna system of claim 1, wherein said narrowband antennas are non-tunable.

12. The antenna system of claim 11, wherein said narrowband antennas support operation in multiple frequency bands.

13. The antenna system of claim 1, wherein the configurations of said first set of configurations is selected from the group consisting of GSM850, GSM900, GSM1800 and GSM1900.

14. The antenna system of claim 1, wherein the configurations of said second set of configurations is selected from the group consisting of LTE700, UMTS850, UMTS 900/LTE 900, UMTS1900, and UMTS 2100/LTE 1700.

15. The antenna system of claim 1, wherein said one or more non-tunable antennas comprises a single wideband antenna capable of transmission and reception in said first set of configurations, and transmission in said second set of configurations.

16. The antenna system of claim 1, wherein said one or more non-tunable antennas comprises a first antenna and a second antenna operable in disjoint groups of configurations.

17. The antenna system of claim 1, wherein said one or more non-tunable antennas support MIMO-diversity transmission in at least one configuration of said first and second sets of configurations.

18. A wireless communications device utilizing the antenna system of claim 1.

19. The wireless communications device of claim 18, wherein the wireless communications device is a personal digital assistant (PDA), a cellular phone, a smart phone, a laptop, or a wireless adapter.

20. An antenna system and radio frequency (RF) front end of a wireless communications device, said antenna system comprising:

one or more non-tunable antennas configurable for transmission and reception in a first set of one or more configurations, and configurable for only transmission in a second set of one or more configurations different from the first set of one or more configurations, wherein configurations in the first and second sets of one or more configurations differ with respect to at least one of frequency hand of operation and communication standard of operation; and two or more narrowband antennas configurable for only Multiple Input Multiple Output (MIMO)-diversity reception for the configurations of said second set;

said radio frequency front end comprising:

a set of one or more switches selectably operable in a position selected from a first set of positions and a second set of positions, the first set of positions adapted to facilitate configuration of the one or more non-tunable antennas in accordance with the first set of one or more configurations, the second set of positions adapted to facilitate configuration of the one or more non-tunable antennas and the two or more narrowband antennas in accordance with the second set of one or more configurations.

21. The antenna system and RF front end according to claim 20, wherein at least one of said narrowband antennas is a tunable antenna.

22. The antenna system and RF front end according to claim 20, wherein said one or more non-tunable antennas comprises at least one wideband antenna.

23. The antenna system and RF front end according to claim 20, wherein said one or more non-tunable antennas comprises a first antenna and a second antenna operable in disjoint groups of configurations.

24. A radio frequency (RF) front end for operation in conjunction with an antenna system of a wireless communications device, said antenna system comprising one or more non-tunable antennas and two or more narrowband antennas, said radio frequency front end comprising:

a set of one or more switches selectably operable in a position selected from a first set of positions and a second set of positions, the first set of positions adapted to facilitate configuration of the one or more non-tunable antennas for transmission and reception, the second set of positions adapted to facilitate configuration of the one or more non-tunable antennas for only transmission, the second set of positions further adapted to facilitate configuration of the two or more narrowband antennas for only Multiple Input Multiple Output (MIMO)-diversity reception, wherein configurations provided by the first and second sets of positions differ with respect to at least one of frequency band of operation and communication standard of operation.

25. The radio frequency front end according to claim 24, wherein the set of one or more switches includes a single-pole multi-throw RF switch or a multi-pole multi-throw RF switch.

26. The radio frequency front end according to claim 25, wherein the set of one or more switches includes one or more switches selected from the group consisting of: solid state switches, electromechanical switches, PIN diode switches, and MEMS switches.

27. The radio frequency front end according to claim 24, wherein the set of one or more switches is configured to selectively establish one or more transmit paths and one or more receive paths in accordance with one of the first set of one or more configurations or the second set of one or more configurations.

28. The radio frequency front end according to claim 27, wherein at least one of the one or more transmit paths comprises a power amplifier.

29. The radio frequency front end according to claim 27, wherein at least one of the one or more receive paths comprises a low noise amplifier.

30. The radio frequency front end according to claim 27, wherein at least one of the one or more transmit paths and the one or more receive paths comprises an RF filter.

31. The radio frequency front end according to claim 27, wherein at least one of the one or more transmit paths and the one or more receive paths includes an RF transformer.

32. A wireless communication device utilizing the RF front end of claim 24.

33. A method for operating an antenna system and radio frequency (RF) front end of a wireless communication device, the antenna system comprising one or more non-tunable antennas configurable for transmission and reception and two or more narrowband antennas configurable for MIMO-diversity reception, the method comprising the steps of:

a) selecting a configuration of the antenna system and the RF front end from a set of potential configurations, said set of potential configurations including a first set of one or more configurations wherein at least one of the one or more non-tunable antennas is configured for transmission and reception, said set of potential configurations including a second set of one or more configurations wherein at least one of the one or more non-tunable antennas is configured for only transmission and at least two of the two or more narrowband antennas are configured for only MIMO-diversity reception, wherein configurations provided by the first and second sets of one or more configurations differ with respect to at least one of frequency band of operation and communication standard of operation; and b) configuring the antenna system and the RF front end in accordance with the selected configuration.

* * * * *

UNITED STATES PATENT AND TRADEMARK OFFICE

CERTIFICATE OF CORRECTION

PATENT NO. : 8,744,373 B2
APPLICATION NO. : 12/717793
DATED : June 3, 2014
INVENTOR(S) : Pourseyed It is certified that error appears in the above-identified patent and that said Letters Patent is hereby corrected as shown below:

IN THE CLAIMS

CLAIM 3, Line 1 Col. 16, Line 52 — Add "1" after "claim"

CLAIM 20, Line 11 Col. 17, Line 55 — Replace "hand" with "band"

Signed and Sealed this
Fifth Day of August, 2014

Michelle K. Lee
*Deputy Director of the United States Patent and Trademark Office*